United States Patent
Brecht et al.

(10) Patent No.: US 9,971,194 B2
(45) Date of Patent: May 15, 2018

(54) SWITCHABLE WINDOW HAVING LOW EMISSIVITY (LOW-E) COATING AS CONDUCTIVE LAYER AND/OR METHOD OF MAKING THE SAME

(71) Applicant: Guardian Glass, LLC, Auburn Hills, MI (US)

(72) Inventors: Greg Brecht, Grosse Pointe Farms, MI (US); Daniel F. Prone, Trenton, MI (US); Timothy J. Frey, Syracuse, IN (US); Jean-Marc Sol, Thionville (FR); Robert A. Vandal, Syracuse, IN (US)

(73) Assignee: Guardian Glass, LLC, Auburn Hills, MI (US)

( * ) Notice: Subject to any disclaimer, the term of this patent is extended or adjusted under 35 U.S.C. 154(b) by 0 days. days.

(21) Appl. No.: 15/410,945

(22) Filed: Jan. 20, 2017

(65) Prior Publication Data
US 2017/0192299 A1 Jul. 6, 2017

Related U.S. Application Data

(63) Continuation of application No. 14/598,328, filed on Jan. 16, 2015, now Pat. No. 9,557,595, which is a
(Continued)

(51) Int. Cl.
*G02F 1/1335* (2006.01)
*G02F 1/1334* (2006.01)
(Continued)

(52) U.S. Cl.
CPC .. *G02F 1/133553* (2013.01); *B32B 17/10036* (2013.01); *B32B 17/10192* (2013.01);
(Continued)

(58) Field of Classification Search
CPC ............ G02F 1/133553; G02F 1/1334; G02F 2203/48; B32B 17/10036;
(Continued)

(56) References Cited

U.S. PATENT DOCUMENTS

| 5,111,329 | A | 5/1992 | Gajewski et al. |
| 5,578,404 | A | 11/1996 | Kliem |

(Continued)

FOREIGN PATENT DOCUMENTS

| EP | 2 128 688 | 12/2009 |
| JP | 2000-155308 | 6/2000 |

(Continued)

OTHER PUBLICATIONS

U.S. Appl. No. 14/598,328, filed Jan. 16, 2015; Brecht et al.
U.S. Appl. No. 13/726,248, filed Dec. 24, 2012; Brecht et al.

*Primary Examiner* — Nathanael R Briggs
(74) *Attorney, Agent, or Firm* — Nixon & Vanderhye P.C.

(57) ABSTRACT

A switchable window includes: first and second substrates (e.g., glass substrates); a liquid crystal inclusive layer (e.g., PDLC layer) disposed between at least the first and the second substrates; and a low-E coating provided between at least the liquid crystal inclusive layer and the first substrate. Voltage is applied to the liquid crystal inclusive layer via the low-E coating and a substantially transparent conductive coating which are on opposite sides of the liquid crystal inclusive layer. By adjusting voltage applied to at least part of the liquid crystal inclusive layer, the window is selectively switchable between at least first and second states with different visible light transmissions.

16 Claims, 11 Drawing Sheets

Related U.S. Application Data continuation of application No. 13/726,248, filed on Dec. 24, 2012, now Pat. No. 8,941,788.

(51) Int. Cl.
  *B60J 3/00* (2006.01)
  *B60J 3/04* (2006.01)
  *B60J 7/043* (2006.01)
  *B32B 17/10* (2006.01)

(52) U.S. Cl.
  CPC .. *B32B 17/10229* (2013.01); *B32B 17/10504* (2013.01); *B60J 3/007* (2013.01); *B60J 3/04* (2013.01); *B60J 7/043* (2013.01); *G02F 1/1334* (2013.01); *B32B 2457/202* (2013.01); *G02F 2203/48* (2013.01)

(58) Field of Classification Search
  CPC ........ B32B 17/10192; B32B 17/10229; B32B 17/10504; B32B 2457/202; B60J 3/007; B60J 3/04; B60J 7/043
  See application file for complete search history.

(56) References Cited

U.S. PATENT DOCUMENTS

| | | |
|---|---|---|
| 5,695,682 A | 12/1997 | Doane et al. |
| 5,853,828 A | 12/1998 | Schimmelpenningh et al. |
| 6,055,088 A | 4/2000 | Fix et al. |
| 6,160,655 A | 12/2000 | Fix et al. |
| 6,466,298 B1 | 10/2002 | Fix et al. |
| 6,486,928 B1 | 11/2002 | Lin et al. |
| 6,887,575 B2 | 5/2005 | Neuman et al. |
| 7,056,588 B2 | 6/2006 | Neuman et al. |
| 7,189,458 B2 | 3/2007 | Ferreira et al. |
| 7,198,851 B2 | 4/2007 | Lemmer et al. |
| 7,771,830 B2 | 8/2010 | Neuman et al. |
| 7,998,320 B2 | 8/2011 | Laird et al. |
| 8,941,788 B2 | 1/2015 | Brecht et al. |
| 8,956,548 B2 | 2/2015 | Clapp et al. |
| 9,557,595 B2 | 1/2017 | Brecht et al. |
| 2002/0171788 A1 | 11/2002 | Lin et al. |
| 2003/0150711 A1 | 8/2003 | Laird |
| 2005/0164015 A1 | 7/2005 | Laird et al. |
| 2006/0246300 A1 | 11/2006 | Hevesi |
| 2009/0115922 A1 | 5/2009 | Veerasamy |
| 2009/0135319 A1 | 5/2009 | Veerasamy |
| 2009/0284821 A1 | 11/2009 | Valentin et al. |
| 2009/0293188 A1 | 12/2009 | Wirchak |
| 2010/0165436 A1 | 7/2010 | Voss et al. |
| 2012/0307337 A1 | 12/2012 | Bartug et al. |

FOREIGN PATENT DOCUMENTS

| | | |
|---|---|---|
| JP | 2003-529785 | 10/2003 |
| JP | 2008-509430 | 3/2006 |
| WO | WO 93/14436 | 7/1993 |
| WO | WO 00/77568 | 12/2000 |
| WO | WO 2009/061329 | 5/2009 |

SWITCHABLE WINDOW HAVING LOW EMISSIVITY (LOW-E) COATING AS CONDUCTIVE LAYER AND/OR METHOD OF MAKING THE SAME

This application is a continuation of application Ser. No. 14/598,328, filed Jan. 16, 2015 (now U.S. Pat. No. 9,557,595), which is a continuation of application Ser. No. 13/726,248, filed Dec. 24, 2012 (now U.S. Pat. No. 8,941,788), the entire disclosures of which are hereby incorporated herein by reference in this application.

This application relates to a switchable window and/or method of making the same, specifically a switchable window having a low emissivity (low-E) coating which is sufficiently conductive to provide an electric field to a switchable liquid crystal inclusive layer.

BACKGROUND

An example of a switchable window is an electrically switchable window which changes light transmission properties in response to an electric field. Known uses of this technology include windows and/or glazings in vehicles, commercial buildings (e.g., offices, conference rooms, lobbies, buildings, store fronts, etc.), and/or residential buildings.

A transparent window, which is always fully transparent, may not be desirable in certain instances. For example, sunlight through a vehicle window may result in glare to the vehicle's passengers and/or excessive heat in the interior of the vehicle. Thus, a preferred window may allow some light to be transmitted at advantageous times and to allow light to be blocked at other advantageous times. To control light transmission through a window, some windows contain a photochromic or thermochromic material which changes its transmissive properties based on the amount of light incident on the material. These changes in transmissive properties are always automatic and cannot be overridden by human or other intervention.

Liquid crystals (LCs)—for example, polymer dispersed liquid crystals (PDLCs) and plasma addressed liquid crystals (PALCs)—vary the intensity of light transmitted through a liquid crystal medium/layer by changing the orientation of the liquid crystal molecules in the medium/layer in response to an electric field. A constant electric field may be applied by a direct current (DC) voltage. Alternatively, the polarity of the electric field may be periodically switched by application of an alternating current (AC) voltage.

The applied voltage may be electrically connected to a controller (e.g., electronic control unit, timer, switch, etc.) to be activated automatically with changing environmental or other conditions, or be activated via a switch by a human operator. LCs may even allow intermediate states between an "on" (transmissive or partially transmissive) state and an "off" (opaque or substantially opaque) state by varying the intensity of the electric field of the liquid crystal medium/layer.

PDLCs are typically made by inducing phase separation in an initially homogeneous mixture of liquid crystal and monomers. Preparation of PDLCs involves a phase separation, which can be triggered by polymerization of the monomer matrix by either ultraviolet (UV) or thermal curing, or even rapid evaporation of solvents. As the monomer polymerizes, the liquid crystal phase separates into microscopic droplets or domains or pockets surrounded by the walls of the cured polymer matrix, which provides a "backbone" to hold the LC. The mixture of cured polymer and LC are held together between two sheets of polyethylene (PET), often coated with transparent conducting oxides (TCOs) through which an electric field is applied. When unaddressed (e.g., when no voltage and/or voltage below a LC threshold voltage is applied), the nematic texture within the domains of the LC is randomly oriented with respect to other neighboring domains, and the display appears whitish and/or opaque caused by the scattering of light.

FIG. 1(a) illustrates a related art PDLC glass window 100 in an off state. Two glass substrates 102a, 102b are provided. A conductive coating 104 is applied to the respective inner surfaces of the outer substrates 102a and 102b. A plurality of liquid crystal (LC) droplets 108 are disposed within the polymer mixture 106. When no voltage is provided, the droplets 108 are randomly oriented, and incident light I refracts off them, causing the scattering of light in the directions shown by the dashed arrows.

In the addressed state (when voltage above the threshold voltage is applied to the liquid crystal layer), the nematic texture in different domains align with the electric field, thus allowing for a clear state as shown in FIG. 1(b). FIG. 1(b) is a related art PDLC glass window 100 in an "on" state. FIG. 1(b) is similar to FIG. 1(a), except that a voltage V is applied to the PDLC layer via conductor 104 and one or more bus bars (not shown). The voltage causes the liquid crystal droplets of the PDLC layer to align substantially parallel to the electric field, allowing incident light I to pass through the window 100 in providing for a clear state.

Although such techniques have represented an improvement in some windows, there still are certain drawbacks. For example, exposure to radiation from the sun may cause degradation of the PDLC. This degradation may be exacerbated with temperature increases in the PDLC.

Degradation of the PDLC may increase the response time of the PDLC which may contribute to a flicker noticeable to the human eye. The degradation may increase the scattering of light waves which may create contribute in part to a residual haze and cause a "browning" of the window when the PDLC is in the clear state.

U.S. Patent Document 2009/0115922 to Veerasamy, the entire contents of which are hereby incorporated herein by reference, attempts to overcome disadvantages through the use of a low-emissivity (low-E) coating.

FIG. 2 is a cross-sectional view of a related art window according to an embodiment of U.S. Patent Document 2009/0115922. In the window of FIG. 2, two substrates (e.g., glass substrates) 202, 204 are provided, including an outer substrate 202 and an inner substrate 204. A low-E coating 206 is deposited on the inner surface of the outer substrate 202. However, the transparent conductive oxide (TCO) layer 212 for applying voltage across the PDLC layer 214 is located between the PDLC layer 214 and the low-E coating 206.

First and second laminate layers 208 are provided. First and second polymer-based (e.g., PET) layers 210 are provided on the inner surfaces of the respective first and second laminate layers 208. A switchable PDLC layer 214 is sandwiched by first and second substantially transparent conductive oxide (e.g., TCO) layers 212. The TCO layers may be sputtered onto one or both surfaces of the PDLC 214 and/or the respective surfaces of the first and second polymer-based layers 210.

The low-E coating 206 of U.S. Patent Document 2009/0115922 reduces the long-term degradation of the LC layer 214. The additional layer 206, however, increases the thickness, manufacturing time, and manufacturing cost of the window.

Therefore, it will be appreciated that there is a need in the art for coated articles that overcome one or more of these and/or other disadvantages. It also will be appreciated that there is a need in the art for improved switchable coated articles for use in, for example, vehicle windows, insulating glass window units, etc.

SUMMARY OF EXAMPLE EMBODIMENTS

In certain example embodiments of this invention, there is provided a low-E coating which is sufficiently conductive to provide an electric field to a liquid crystal inclusive layer (e.g., PDLC layer) of a coated article.

In certain example embodiments of this invention, there is provided a switchable window comprising: a first glass substrate and a second glass substrate; a liquid crystal inclusive layer disposed between at least the first glass substrate and the second glass substrate; a low-E coating provided between at least the liquid crystal inclusive layer and the first glass substrate; wherein the low-E coating includes at least one infrared (IR) reflecting layer comprising silver that is located between at least first and second dielectric layers; a substantially transparent conductive coating provided between at least the liquid crystal inclusive layer and the second glass substrate, so that voltage is to be applied to the liquid crystal inclusive layer via the low-E coating and the substantially transparent conductive coating which are on opposite sides of the liquid crystal inclusive layer; and wherein, by adjusting voltage applied to at least part of the liquid crystal inclusive layer via the low-E coating and the substantially transparent conductive coating, the window is selectively switchable between at least first and second states, where the window has a higher visible light transmission in the first state than in the second state.

In certain example embodiments of this invention, there is provided a switchable window comprising: a first substrate and a second substrate; a liquid crystal inclusive layer disposed between at least the first substrate and the second substrate; first and second transparent conductive coatings provided on opposite sides of the liquid crystal inclusive layer so that voltage can be applied to the liquid crystal inclusive layer via the first and second transparent conductive coatings, wherein by adjusting voltage applied to at least part of the liquid crystal inclusive layer via the first and second transparent conductive coatings the window is selectively switchable between at least first and second states, where the window has a higher visible light transmission in the first state than in the second state; wherein at least one of the first and second transparent conductive coatings is patterned into at least first, second, and third different electrically addressable areas that are substantially electrically isolated from each other so that the first, second, and third electrically addressable areas of the coating can be separately electrically addressed; wherein the first electrically addressable area of the coating is for applying voltage to the liquid crystal inclusive layer in order to adjust visible transmission of the window; and an electrically active device, wherein the second electrically addressable area of the coating, the electrically active device, and the third electrically addressable area of the coating are electrically connected in series.

DETAILED DESCRIPTION OF EXAMPLE EMBODIMENTS

Figure 1:
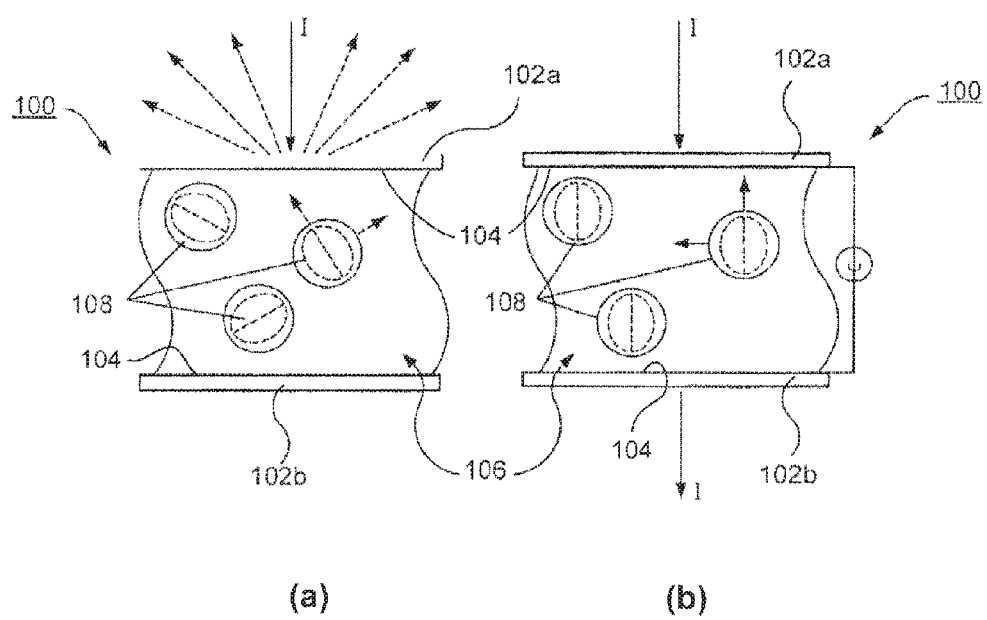
FIG. 1 illustrates a cross-sectional view of a related art PDLC window.

A detailed description of example embodiments is provided with reference to the accompanying drawings. Like reference numerals indicate like parts throughout the drawings. Drawings are intended to illustrate example embodiments to one or ordinary skill in the art. Accordingly, they are not to scale nor are they the same scale.

The phrases "on" or "supported by" as used herein include both directly on (i.e. contacting) as well as indirectly on with other layer(s) therebetween. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention. Thus, the use of the phrases "on" or "supported by" herein is not limited to direct contact.

Windows according to example embodiments of this invention may be vehicle windows, residential housing windows, or commercial building windows. For example, windows according to example embodiments of this invention may be for a vehicle sunroof, or for any other vehicle or building window.

Figure 2:
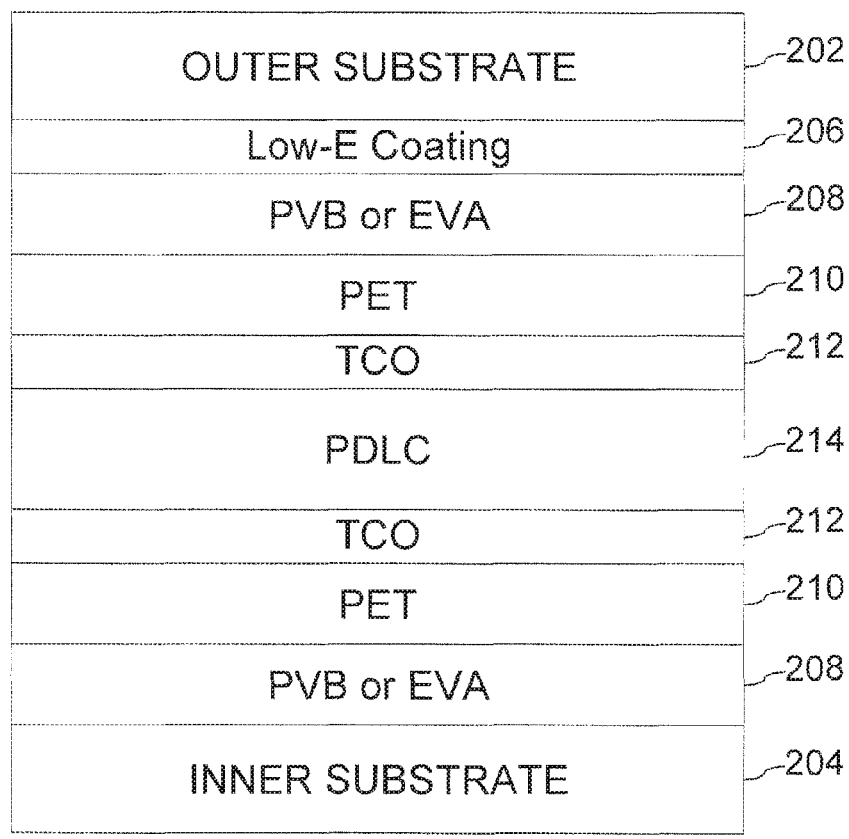
FIG. 2 illustrates a cross-sectional view of a related art PDLC window.

In certain example embodiments of this invention, referring to FIG. 2, the position of the low-E coating 206 from FIG. 2 is moved to a new location in order to replace a TCO layer 21. In other words, according to an example embodiment of this invention, the upper TCO layer 212 in FIG. 2 is removed and is replaced with the low-E coating 206 (i.e., the position of the low-E coating 206) is moved so as to replace this TCO layer), thereby reducing the need for at least one of the conductive layers in the stack in order to save cost and so forth.

Figure 3:
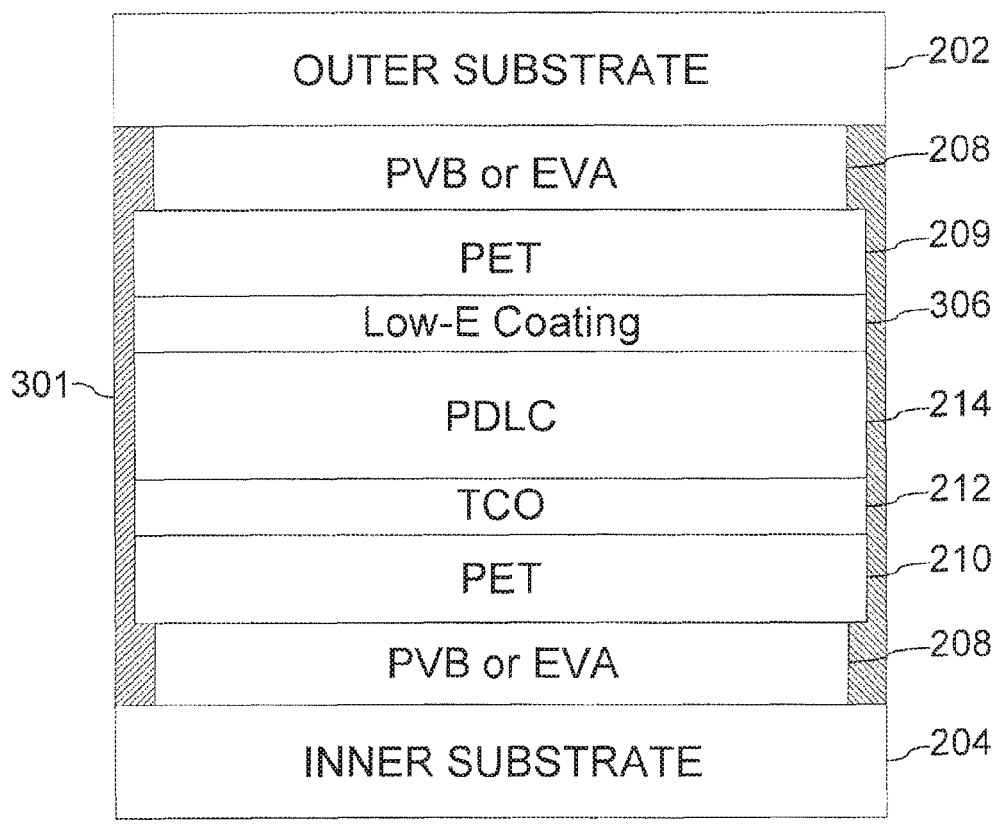
FIG. 3 illustrates a cross-sectional view of at least part of a window according to a first example embodiment of the present invention.

FIG. 3 illustrates a cross-sectional view of a coated article, which is at least part of a window, according to a first example embodiment.

In the coated article of FIG. 3, two substrates (e.g., glass substrates) are provided, including an outer substrate 202 which is closest to a vehicle or building exterior and an inner substrate 204 which is closest to a vehicle or building interior. Thus, the "inner" substrate 204 is closest to the interior of the building or vehicle in/on which the window is mounted.

First and second laminate layers 208, which may be of or include a polymer-based material (e.g., PVB, EVA, transparent polyurethane (TPU), polyvinyl chloride, a polyester, polycarbonate, polypropylene, polyethylene, and/or polyurethacrylate, etc.), may be applied on the inner surface of the outer substrate 202 and on the inner surface of the inner substrate 204 as illustrated in FIG. 3. First polymer-based (e.g., PET) layer 209 may be provided on the inner surface of one laminate layer 208 and a second polymer-based (e.g., PET) layer 210 may be provided on the inner surface of the other laminate layer 208 as shown in FIG. 3. A liquid crystal inclusive layer 214 (e.g., PDLC layer) is sandwiched between at least a low-E coating 306 and a substantially transparent conductive (e.g., TCO) coating 212. Optionally, alignment layers (not shown) may be provided on opposite sides of the LC inclusive layer 214 for the purpose of pre-alignment LC molecules of the layer 214. Thus, it is possible that alignment layers may be provided between the liquid crystal layer 214 and the conductive coatings 212, 306. The low-E coating 306 may be deposited on (directly or indirectly) the outer surface of the liquid crystal inclusive layer 214 and/or the inner surface of the first polymer-based layer 209. The substantially transparent conductive coating 212 may be deposited on (directly or indirectly) the outer surface of the liquid crystal inclusive layer 214 and/or the inner surface of the second polymer-based layer 210. Transparent conductive coating 212 is a transparent conductive oxide (TCO) layer in the FIG. 3 embodiment (e.g., ITO, zinc oxide, tin oxide, etc.), but alternatively may be a multi-layer low-E coating in other embodiments of this invention.

The substantially transparent conductive coating 212 may be of or include oxidized or substantially oxidized metals or dopant incorporated into oxidized or substantially oxidized metals. For example, the substantially transparent conductive coating 212 may be of or include a homogeneous layer of fully or nearly fully oxidized layers of indium oxide, indium-tin-oxide (ITO), cadmium-tin-oxide (CTO), fluorine-doped tin oxide ($SnO_x$:F), fluorine-doped zinc aluminum oxide ($ZnAlO_x$:F), zinc oxide, and/or aluminum-doped zinc oxide (ZnO:Al). Alternatively, the transparent conductive coating 212 may be a low-E coating.

In example embodiments of the present invention, the coated article may include potting material 301. In example embodiments which include the potting material 301, the first polymer-based layer 209 and the second polymer-based layer 210 may be wider than the laminate layers 208 but not wider than the outer substrate 202 and the inner substrate 204. For example, the first polymer-based layer 209 and the second polymer-based layer 210 may be almost flush with the outer substrate 202 and the inner substrate 204.

One or more bus bars may be provided, e.g., to provide voltage to the liquid crystal inclusive layer 214, either directly or indirectly. In certain example embodiments, two bus bars are respectively connected to the low-E coating 306 and the substantially transparent conductive coating 212. A groove or channel may be cut or otherwise formed in each of the first and second laminate layers 208 and/or layers 209-210 in order to accommodate the bus bars in certain example embodiments. In certain example embodiments, when viewed in cross section, the grooves may be substantially U-shaped, with the first groove being upwardly oriented and the second groove being downwardly oriented. Also, in certain example embodiments, the grooves may be disposed at opposing corners of the liquid crystal inclusive stack, e.g., such that the first groove is disposed in the upper left corner of the liquid crystal inclusive stack while the second groove is disposed in the lower right corner of the liquid crystal inclusive stack. Of course, it will be appreciated that the foregoing description is provided by way of example and without limitation and that other bus bar arrangements may be used in connection with certain other example embodiments (e.g., when only one bus bar is used, when differently shaped channels are formed, etc.). Each groove may be formed by laser cutting (e.g., using a $CO_2$ laser), using a half-cutter, or via any other suitable means. The groove may be filled with a silver paste, and a flat wire ribbon may be bonded thereto, so that the bus bars can respectively communicate with conductive coatings 306 and 212 in order to selectively allow voltage to be applied to (including across) the liquid crystal inclusive layer 214 via conductive coatings 306 and 212. Voltage may be provided through this ribbon and coatings 306, 212 so as to cause the liquid crystal inclusive layer 214 to become activated. The bus bars may be electrically connected to a controller (e.g., electronic control unit, timer, switch, etc.) to be activated automatically with changing environmental or other conditions, or be activated via a switch by a human operator, so that the visible transmission of the window can be adjusted either automatically or manually.

The low-E coating(s) 306 herein may be a multi-layer low-E coating. The low-E coating(s) 306 may be any suitable low-E coating, including for example any of the low-E coatings described and/or illustrated in any of U.S. Patent Document No. 2009/0115922, U.S. Pat. Nos. 7,998,320, 7,771,830, 7,198,851, 7,189,458, 7,056,588, or 6,887,575, the entire contents of each of which are all hereby incorporated herein by reference. Alternatively, the low-E coating(s) 306 herein may be a split silver XIR 70 low-E coating available from Southwall Technologies, or a XIR 70HP low-E coating from Southwall Technologies. The low-E coating 306 may possibly be deposited on a PET film (209 and/or 210), and then applied together with the PET film in making the window. In embodiments where transparent conductive coating 212 is also a low-E coating, the coating 212 may also be any suitable low-E coating including but not limited to the low-E coatings described in the patent documents identified above. A low-E coating includes one or more infrared (IR) reflecting layers, where the IR reflecting layer(s) are typically of or include silver (Ag). For example, the one or more IR reflecting layers comprising silver are electrically conductive and may be substantially or entirely metallic. The IR reflecting layer(s) of a low-E coating may comprise or consist essentially of silver, gold, or any other suitable IR reflecting material. The low-E coating 306 may include, for example, two or three IR reflecting layers (e.g., two or three silver or silver-based layers). The IR reflecting layers, however, may be slightly oxidized in certain example embodiments. In example embodiments, low-E coating 306 includes at least one infrared (IR) reflecting layer of or including silver that is located between (contacting or non-contacting) at least first and second dielectric layers. In certain example embodiments, one or more of the silver based IR reflecting layers of the low-E coating 306 is located on and directly contacting a layer of or including zinc oxide. The low-E coating 306 may or may not include a UV blocking layer(s).

The low-E coating 306 is sufficiently conductive such that when a voltage is applied (e.g., through a connection to the one or more bus bars described above) an electric field is provided to liquid crystal inclusive layer 214 via conductive coatings 306 and 212. In some example embodiments, the low-E coating 306 may further includes an electrically conductive metal layer (e.g., copper or silver) to increase conductivity. The low-E coating 306 may have a sheet resistance less than about 15 ohms/square, more preferably about 12 to 14 ohms/square, even more preferably less than about 8 ohms/square, and possibly less than about 6 or 4 ohms/square.

The low-E coating 306 may have a visible transmittance of at least about 40 percent, more preferably at least about 50 percent, even more preferably at least about 65 percent, more preferably at least about 70 percent, even more preferably at least about 75 percent. The same visible transmission percentages also apply to transparent conductive coating 212. The IR reflecting layer(s) (e.g., silver layers) of the low-E coating 306 are conductive and can function as electrode(s) in windows in certain example embodiments of this invention. Coating 212 may be a low-E coating or may be a coating such as ITO, zinc oxide, zinc aluminum oxide, or fluorine-doped tin oxide.

Figure 8A:
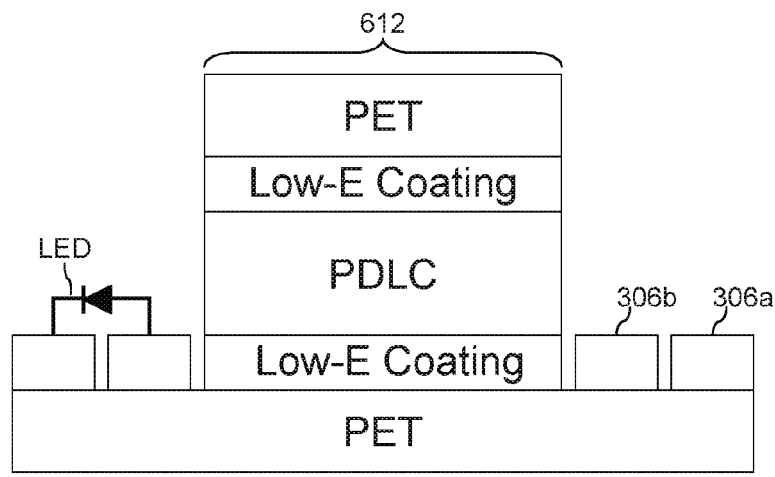
FIGS. 8(a) and 8(b) illustrate cross-sectional and top-down views respectively of at least part of a window including electrically active elements, which may be used in any of the embodiments of FIGS. 3-5 and/or 7.
Figure 8B:
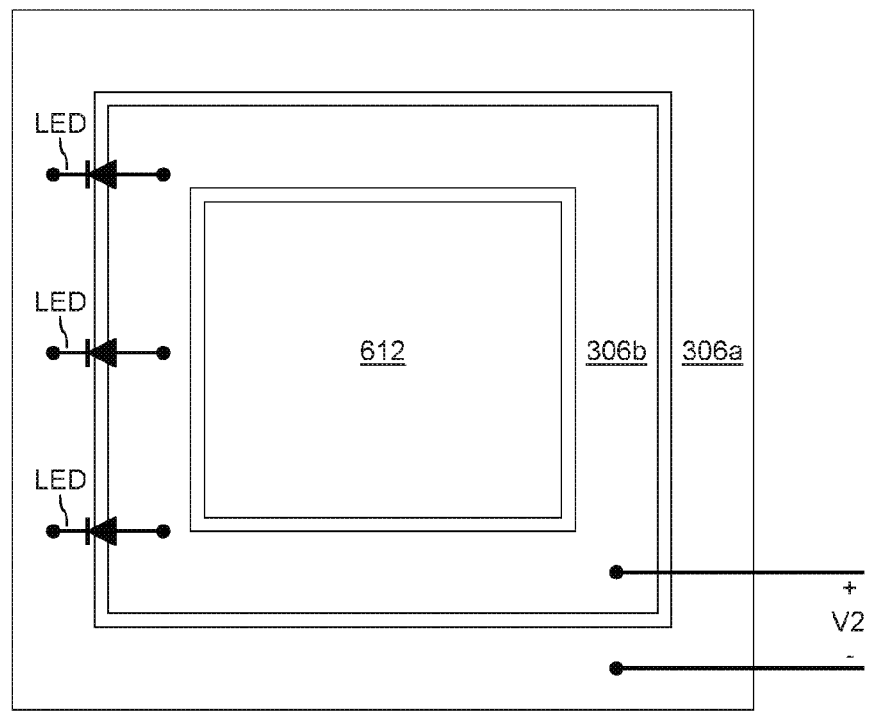
Figure 9A:
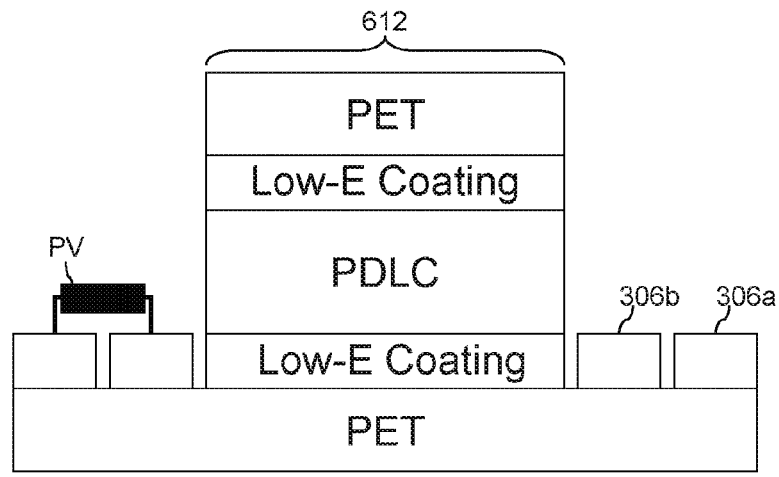
FIGS. 9(a) and 9(b) illustrate cross-sectional and top-down views respectively of at least part of a window including electrically active elements, which may be used in any of the embodiments of FIGS. 3-5 and/or 7.
Figure 9B:
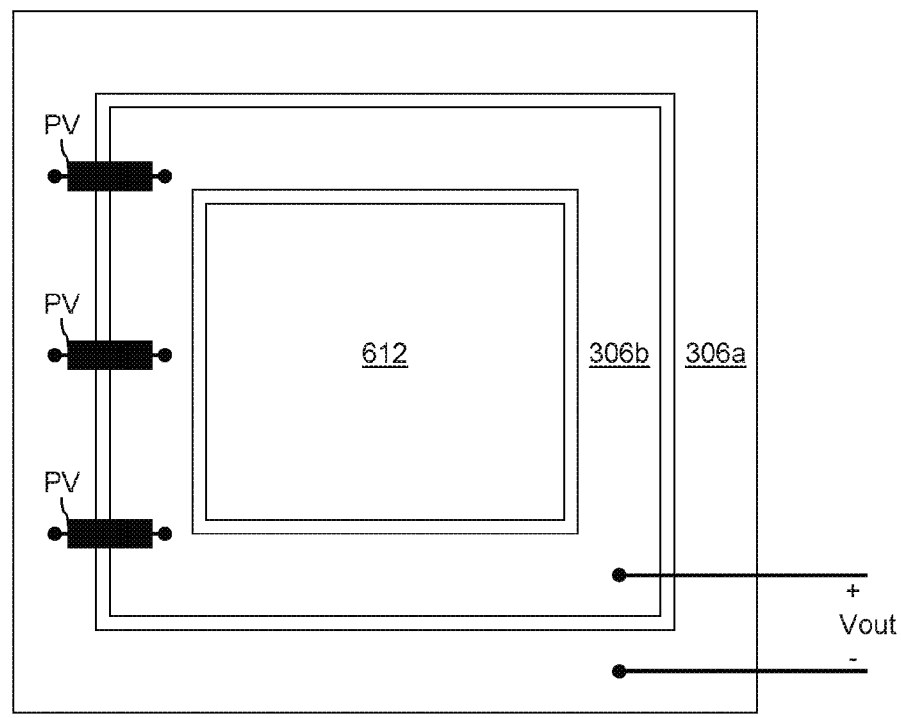
Figure 10:
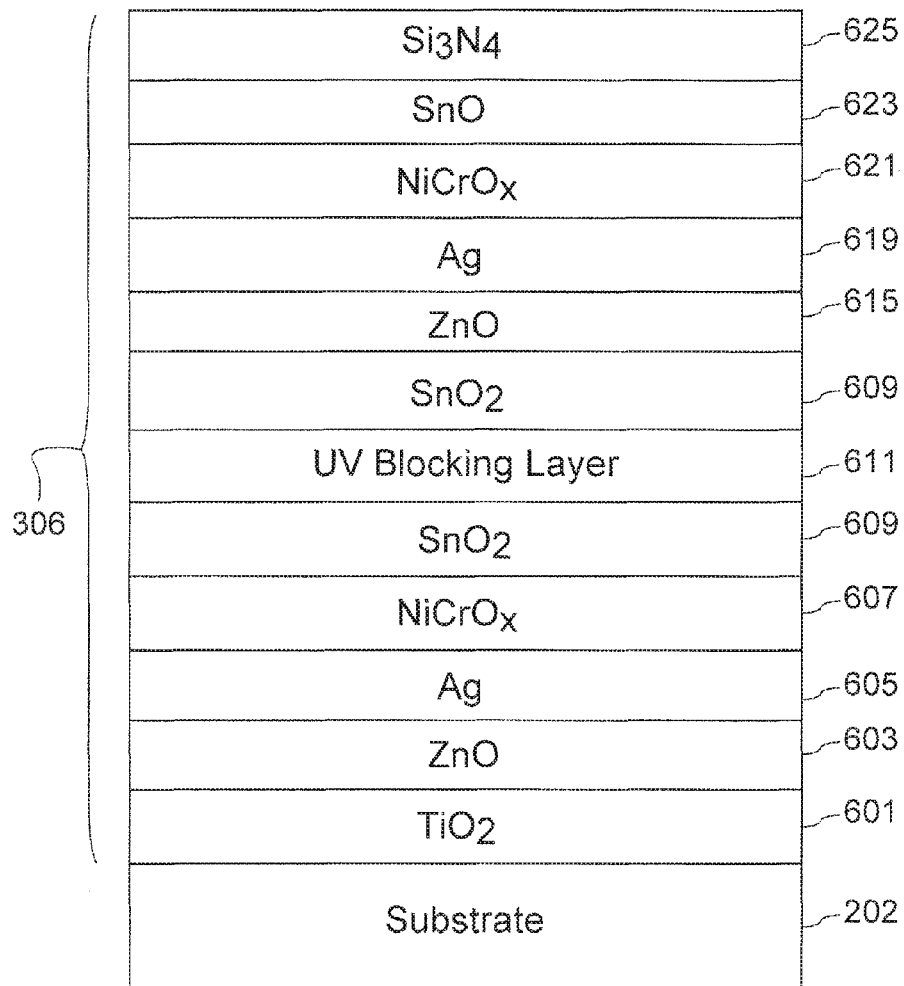
FIG. 10 is a cross sectional view of an example low-E coating that may be used in connection with any of the FIG. 3-9 embodiments.
Figure 11:
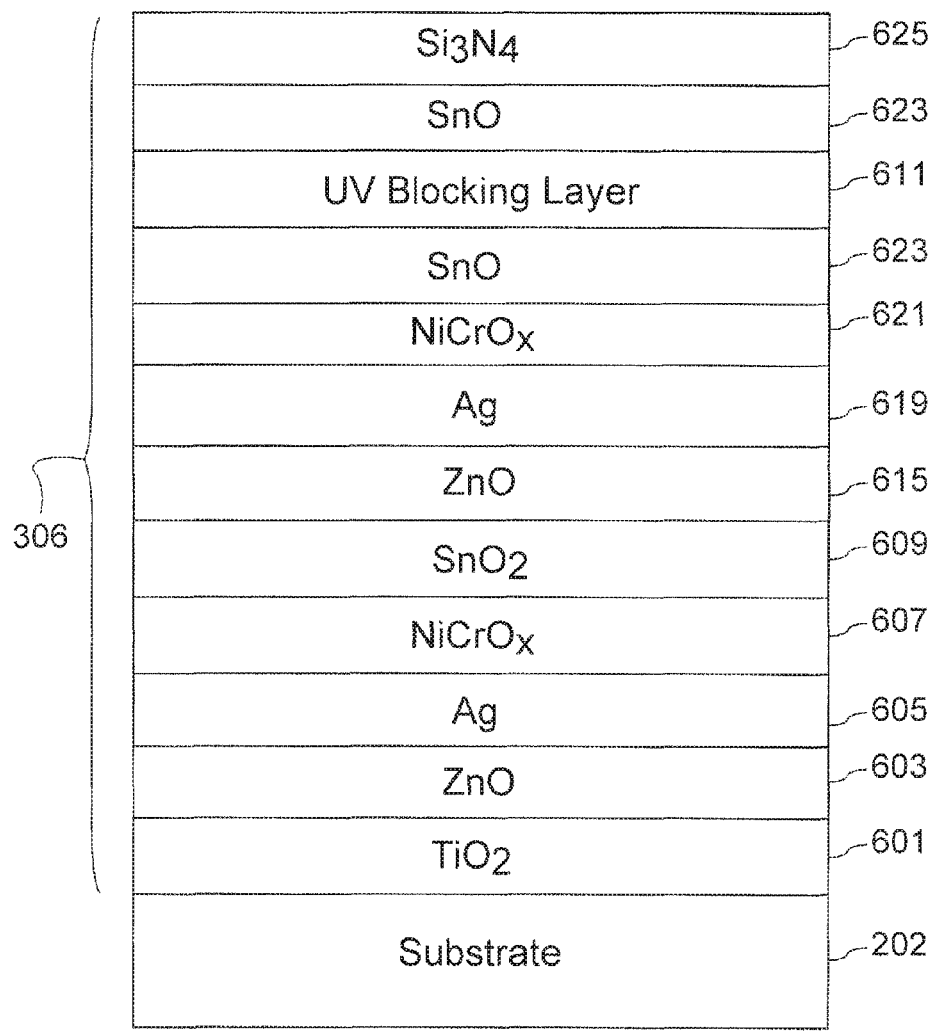
FIG. 11 is a cross sectional view of an example low-E coating that may be used in connection with any of the FIG. 3-9 embodiments.

For example, FIGS. 10 and 11 illustrate example transparent low-E coatings 306 that may be used in any of the embodiments of FIGS. 3-9. In FIGS. 10-11, note that PVB/EVA layer 208 and/or PET layer 209 may be provided between the substrate 202 and the low-E coating 306. The example low-E coating 306 in FIG. 10 and/or FIG. 11 may be used as the low-E coating(s) according to any embodiment herein, although of course other types of low-E coatings may instead be used. The example low-E coating 306 in FIG. 10 includes: dielectric titanium oxide layer 601 which may be $TiO_x$ (e.g., where x is from 1.5 to 2.0), first lower contact layer 603 (which contacts IR reflecting layer 605), first conductive and preferably metallic or substantially metallic infrared (IR) reflecting layer 605, first upper contact layer 607 (which contacts layer 605), dielectric layer 609 (which may be deposited in one or multiple steps in different embodiments of this invention), dielectric layer 615 may be of or include zinc oxide, second conductive and preferably metallic or substantially metallic IR reflecting layer 619, second upper contact layer 621 (which contacts layer 619), dielectric layer 623, and finally protective dielectric layer 625. At least one of the conductive IR reflecting layers functions as an electrode for applying voltage to the liquid crystal inclusive layer. The "contact" layers 603, 607, 615, and 621 each contact at least one IR reflecting layer (e.g., layer based on Ag, Au, or the like). The aforesaid layers 601-625 make up low-E coating 306 of the FIG. 10 embodiment. Upper contact layers 607 may be of or include NiCr, NiCrOx, or the like, and may or may not be dielectric. At least layers 601, 603, 609, 615, 623 and 625 of the low-E coating are preferably dielectric in example embodiments. Thus, each silver based IR reflecting layer 605 and 619 is located between at least first and second dielectric layers. The same materials/reference numerals apply to the example low-E coating 306 shown in FIG. 11.

To provide enhanced UV blocking features (e.g., blockage of light having a wavelength in the range of about 380-400 nm), additional layers may be added to the low-E coating 306. For example, in FIG. 10, dielectric layer 609 may be "split" and an additional UV blocking layer 611 may be added (e.g., between successive layers of the dielectric layer 609). That is, at least some of dielectric layer 609 may be deposited, the UV blocking layer 611 may be deposited, and then the rest of the dielectric layer 609 may be deposited. The UV blocking layer 611 may be of or include zinc oxide doped with bismuth (e.g., ZnBiO or other suitable stoichiometry) or simply bismuth oxide (BiO) in certain example embodiments. In certain other example embodiments, the UV blocking layer 611 may include silver oxide (e.g., $AgO_x$ or other suitable stoichiometry), as described, for example, in U.S. Pat. No. 6,596,399, the entire content of which is hereby incorporated herein by reference. Similarly, in FIG. 11, the tin oxide based dielectric layer 623 may be split and the UV blocking layer 611 may be inserted therein. In still other example embodiments, a UV blocking layer 611 surrounded by dielectric layers (e.g., of tin oxide) may be located anywhere in the low-E stack.

Conductive infrared (IR) reflecting layers 605 and 619 are preferably substantially or entirely metallic, and may comprise or consist essentially of silver (Ag), gold, or any other suitable IR reflecting material. IR reflecting layers 605 and 619 help allow the coating to have low-E and/or good solar control characteristics, and one or more of these IR reflecting layers also provide conductivity sufficient to apply voltage to the LC inclusive layer 214 as discussed herein in order to selectively adjust the visible transmission of the layer 214 and thus of the window.

Lower contact layers 603 and/or 615 in certain embodiments of this invention are of or include zinc oxide (e.g., ZnO) and may be dielectric. The zinc oxide of layer(s) 603, 615 may contain other materials as well such as Al (e.g., to form $ZnAlO_x$). For example, in certain example embodiments of this invention, one or more of zinc oxide layers 603, 615 may be doped with from about 1 to 10% Al, more preferably from about 1 to 5% Al, and most preferably about 2 to 4% Al. The use of zinc oxide 603 under the silver 605 allows for an excellent quality of silver to be achieved.

Dielectric layer 609 may be of or include tin oxide in certain example embodiments of this invention. However, as with other layers herein, other materials may be used in different instances. Dielectric layer 623 may be of or include tin oxide in certain example embodiments of this invention. However, layer 623 is optional and need not be provided in certain example embodiments of this invention. Dielectric layer 625, which may be an overcoat including one or more layers in certain example instances, may be of or include silicon nitride (e.g., $Si_3N_4$) or any other suitable material in certain example embodiments of this invention. Optionally, other layers may be provided above layer 625. For example, an overcoat layer of or including zirconium oxide (not shown) may be formed directly on top of the silicon nitride layer 625 in certain example embodiments of this invention. Silicon nitride layer 625 may be doped with Al or the like in certain example embodiments of this invention.

Other layer(s) below or above the illustrated example low-E coatings 306 of FIGS. 10-11 may also be provided. Moreover, certain layers of the illustrated low-E coatings may be removed in certain embodiments, while others may be added between the various layers or the various layer(s) may be split with other layer(s) added between the split sections in other embodiments of this invention without departing from the overall spirit of certain embodiments of this invention.

In certain example embodiments, a polymer (e.g., of or including an acrylic and/or an amide) may be provided at the periphery (e.g., proximate, although not necessarily limited, to the edges) of the PDLC film. This polymer may act as barrier, reducing migration of the PVB plasticizer, and reducing the chances of the LC being disrupted. Thus, certain example embodiments may include a polymer barrier proximate to the periphery of the PDLC film so as to reduce migration of the PVB and/or disruption of the LC inclusive layer. Additionally, encapsulating the PVB, TPU and/or EVA proximate to the periphery (e.g., also proximate to where electrical contacts are made), advantageously reduces the assembled unit's susceptibility to humidity encroachment over time. In addition, the combination of the LC-inclusive layer, the PVB, TPU, and/or EVA, and/or other materials in the assembled unit increases sound attenuation. For example, certain example embodiments, it is possible to achieve sound attenuation up to about 45 dB in the 10-12 kHz band.

Liquid crystal inclusive layer 214 may be made by, for example, emulsion techniques and by solvent-induced phase separation. For example, thin LC-films may be cast from solution onto suitable transparent substrates. In certain example implementations, heat stability may be provided by using a LC mixture formulation that is stable up to at least about 100° C., more preferably up to at least about 110° C., and still more preferably up to at least about 120° C. (e.g., in connection with automotive applications). In other words, the LCs in the polymer, the polymer itself, and the mixture thereof, may be stable up to at least about 100° C., more preferably up to at least about 110° C., and still more preferably up to at least about 120° C. One type of LC mixture suitable for use in certain example implementations is commercially available from iGlass, which makes a mixture suitable for high-temperature applications. The iGlass LC mixture involves LCs that have a generally crystalline, basically oblique, structure. Such LC molecules preferably rotate from about 30-600, and more preferably to about 40 degrees, at the application of voltage. High temperature LCs commercially available from Merck (for example, those available with the trade name LICRI-LITE™) also may be used in connection with certain example embodiments. It will be appreciated that iGlass and Merck are only two examples of providers of LCs and/or mixtures that may be used in connection with certain example embodiments. Indeed, any suitable nematic LC (e.g., nematic LCs having a higher glass transition temperature) may be used in connection with a suitable polymer (e.g., a formulated polymer) capable of withstanding such temperatures may be used in connection with certain example embodiments. It has been determined that only a few volts per micrometer of film thickness are needed to induce optical switching in certain example instances.

Figure 4:
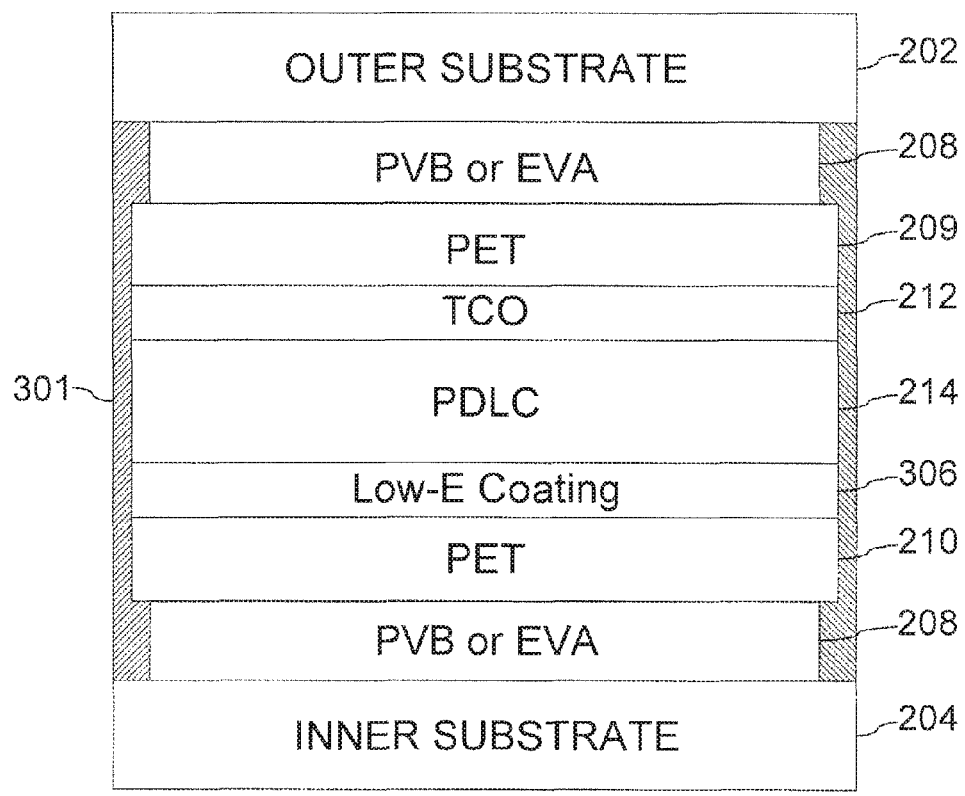
FIG. 4 illustrates a cross-sectional view of at least part of a window according to a second example embodiment of the present invention.

FIG. 4 illustrates a cross-sectional view of a coated article for use in a window according to a second example embodiment. The coated article of FIG. 4 is similar to the coated article described with reference to FIG. 3, except that the positions of the low-E coating 306 and the conductive coating 212 are reversed.

Figure 5:
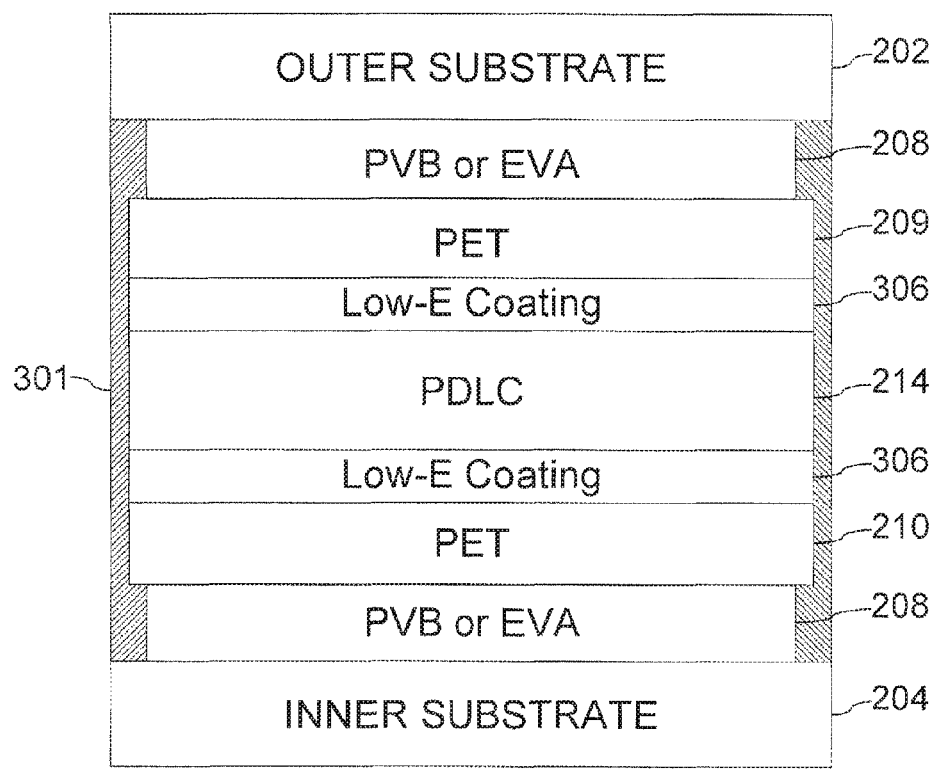
FIG. 5 illustrates a cross-sectional view of at least part of a window according to a third example embodiment of the present invention.

FIG. 5 illustrates a cross-sectional view of a coated article for use in a window according to a third example embodiment. The coated article of FIG. 5 is similar to the coated article described above regarding FIG. 3, except that in the FIG. 5 embodiment the transparent conductive coating between the inner substrate 204 and the LC inclusive layer 214 is also a low-E coating 306. In other words, in the FIG. 5 embodiment low-E coatings 306 are provided on both sides of the LC inclusive layer 214 so that voltage applied thereto is via the pair of low-E coatings 306.

The visible transmission (Tvis) of the windows described herein, when the LC inclusive layer 214 is in the transmissive state (e.g., when significant voltage is applied thereto), is preferably at least about 15%, more preferably at least about 40%, more preferably from about 55 to 80 percent, most preferably from about 65 to 80 percent.

In example embodiments, a coated article (for example, of the type described above with reference to FIGS. 3 through 5) may have a conductive coating (e.g., 306 and/or 212) that is patterned into multiple electrically substantially isolated areas which may be independently addressed and activated.

Figure 6A:
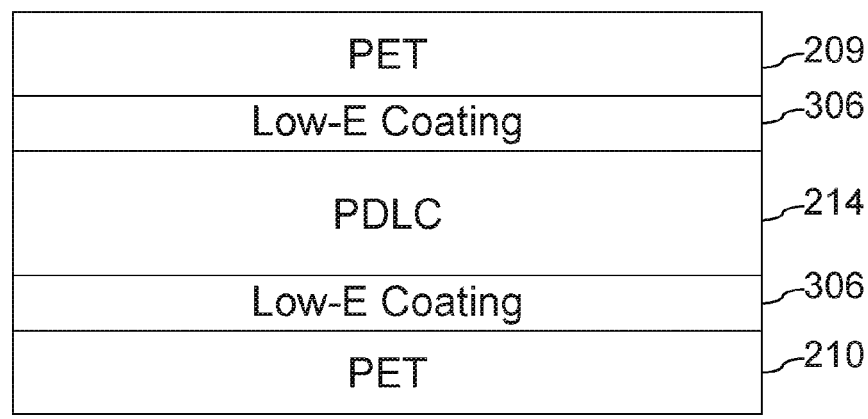
FIGS. 6(a) and 6(b) illustrate cross-sectional views of steps in making a coated article with multiple electrically isolated areas of a low-E coating, which may be used in any of the embodiments of FIGS. 3-5.
Figure 6B:
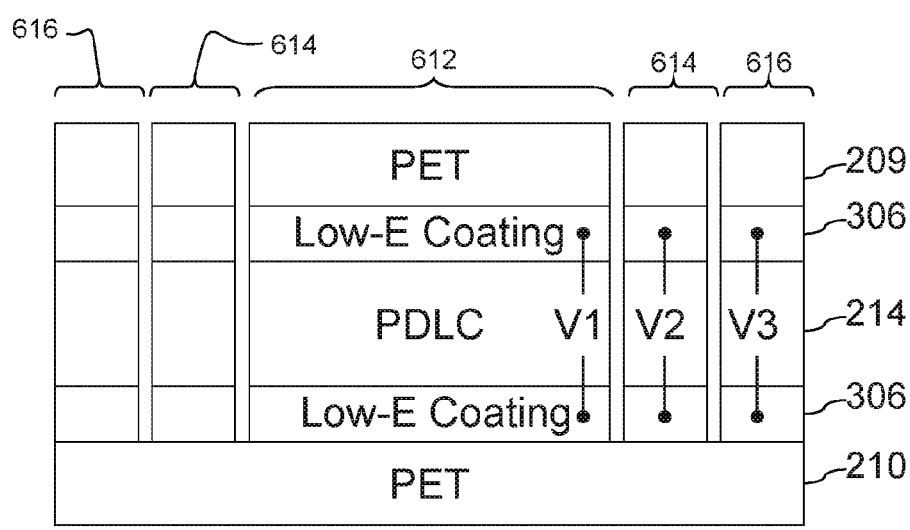

FIGS. 6(a) and 6(b) illustrate a cross-sectional view of a coated article for use in a window where the low-E coating(s) 306 is/are patterned to form multiple electrically isolated areas such as 612, 614 and 616 that may be independently addressable. The coated article of FIG. 6(a) may include a liquid crystal inclusive (e.g., PDLC) layer 214 sandwiched by a first and second low-E coatings 306 as shown in FIG. 5 (or alternatively an LC inclusive layer 214 sandwiched between layers 306 and 212 as in FIGS. 3-4), and sandwiched by a first polymer-based layer 209 and second polymer-based layer 210. As described above with reference to FIGS. 3 to 5, either or both of the low-E coatings 306 may be replaced with a substantially transparent conductive (e.g., TCO) layer 212 and the coated article may also include first and/or second laminate (e.g., PVB or EVA) layers 208 and outer substrate 202 and/or inner substrate 204. As shown in FIG. 6(b), first polymer-based layer 209, liquid crystal inclusive (e.g., PDLC) layer 214, and low-e coatings 306, which may be substantially uniform and substantially continuous across the entire surface or nearly the entire surface of the substrate(s), may be separated by patterning (e.g., via photolithography, laser, and/or etching). These cuts may be made, for example, with a laser which moves across the surface of the film(s) while pulses of high power ablate the conductive low-e coating to isolate separate areas in the coating. Alternatively, the cuts may be made mechanically using a precision depth cutting tool and/or edge. Alternatively, the cuts may be made chemically by previously coating low-e coating 306 with a photopolymerizable film which is subsequently exposed to actinic radiation to allow for chemical etching of selective areas following removal of the residual photopolymer. Therefore, low-e coating 306 may be particularly advantageous versus traditional TCO coatings because low-e coating 306 is easily ablated by laser energy.

The patterning of the low-e conductive film—whether it be ablatively, chemically, mechanically, etc.—may be in conjunction with patterning of one or more of the other layers of the coated article. For example, the first polymer-based layer 209, the low-E coatings 306, and liquid crystal inclusive layer 214 may be patterned while the second polymer-based layer 210 may not be patterned. The outer substrate 202 and the inner substrate 204 are not patterned. The patterning process may be performed prior to the PDLC process in certain example embodiments so as to produce a coated article which is compatible with the process of creating the PDLC film.

As shown in FIG. 6(b), patterning the low-e coating 306 creates independently addressable areas. For example, areas 612, 614, and 616 may be activated by voltages V1, V2, and V3, respectively. Voltages V1, V2, and V3 (supplied, for example, by one or more bus bars as described above) may be supplied or controlled by one or more controllers (e.g., electronic control units, timers, switches, etc.) to be activated automatically with changing conditions, or be activated via a switch by a human operator. Accordingly, the light transmission properties each of the areas 612, 614, and 616 may be controlled independently. When viewed from above, the areas 612, 614 and 616 may be oriented similar to the independently addressable areas in FIG. 7 discussed below.

Figure 7A:
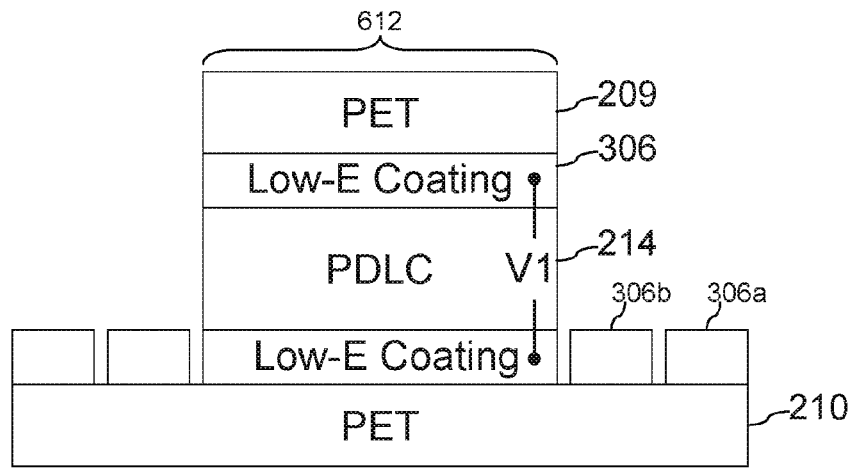
FIGS. 7(a) and 7(b) illustrate cross-sectional and top-down views respectively of at least part of a window including independently addressable conductive areas, which may be used in any of the embodiments of FIGS. 3-5.
Figure 7B:
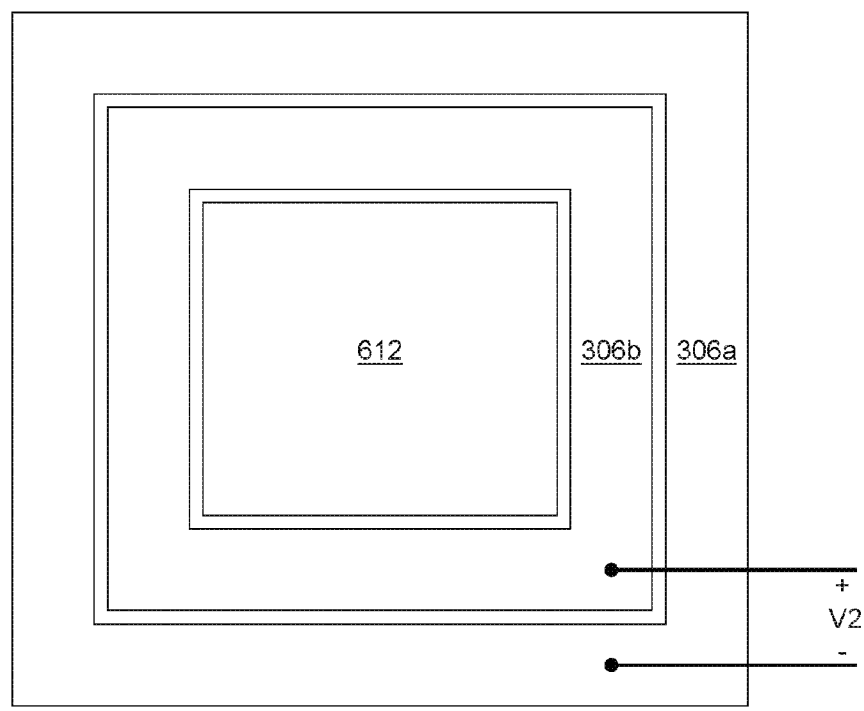

In another embodiment of this invention, it may be desirable to incorporate electrically active elements into the window. FIG. 7(*a*) illustrates a cross-sectional view of a coated article for use in a window including independently addressable conductive areas. FIG. 7(*b*) illustrates a top-down view of the coated article of FIG. 7(*a*). As shown in FIG. 7(*a*), sections of the first polymer-based layer 209, one low-E coating 306 (or layer 212), and liquid crystal inclusive layer 214 have been removed to expose low-E coating area 306*a* and low-E coating area 306*b*. Alternatively the liquid crystal inclusive layer 214 and first polymer-based layer 209 may be made smaller than the second polymer-based layer 210 and patterned low-E coating. Voltage V1 may be supplied, for example, by one or more bus bars as described above and may be controlled by a controller as described above, in order to switch the LC inclusive layer 214 back and forth between states of varying visible transmission (e.g., between a substantially transmissive state and a substantially opaque or less transmissive state). Accordingly, the light transmission property of area 612 will vary in response to the generated electric field. As shown in FIG. 7(*b*), a voltage V2 may be supplied between other areas 306*b* and 306*a* (e.g., between low-E coating area 306*a* and low-E coating area 306*b* which are thus independently addressable). Voltage V2 may be supplied, for example, by one or more bus bars as described above and may be controlled, for example, by a controller as described above.

FIG. 8(*a*) illustrates a cross-sectional view of a coated article for use in a window including electrically active elements. FIG. 8(*b*) illustrates a top-down view of the coated article of FIG. 8(*a*). Electrically active elements (e.g., LEDs or photovoltaic devices) may be electrically connected to two or more independently conductive areas 306*a*, 306*b* of the patterned low-E coating 306. For example, as shown in FIGS. 8(*a*) and 8(*b*), light emitting devices (e.g., light emitting diodes (LEDs)) may be electrically connected (e.g., by an epoxy) between two independently conductive areas of the low-E coating 306 which are thus independently addressable (e.g., between low-E coating area 306*a* and low-E coating area 306*b*). The light emitting devices may be controlled by voltage V2, which may be supplied, for example, by one or more bus bars and may be controlled, for example, by a controller. As shown in FIGS. 8(*a*) and 8(*b*), the coated article may also include one or more areas (e.g., area 612) wherein the light transmission property of the LC inclusive layer 214 varies in response to an electric field (e.g., supplied by voltage V1).

FIG. 9(*a*) illustrates a cross-sectional view of a coated article for use in a window including electrically active elements. FIG. 9(*b*) illustrates a top-down view of the coated article of FIG. 9(*a*). FIGS. 9(*a*)-(*b*) are similar to FIGS. 8(*a*)-(*b*) except that the electrically active elements are photovoltaic devices (PV) as opposed to LEDs. Thus, one or more photovoltaic devices PV may be electrically connected (e.g., by an epoxy) between two independently conductive areas of the low-E coating 306 (e.g., between low-E coating area 306*a* and low-E coating area 306*b*). Energy generated by photovoltaic devices PV may be output as voltage Vout, for example, by one or more bus bars as described above.

Although certain example embodiments have been described in relation to various applications, the present invention is not limited thereto. The techniques of certain example embodiments may be applied to any glass and/or window-like application. Also, the features, aspects, advantages, and example embodiments described herein may be combined to realize yet further embodiments.

In example embodiments of this invention, there is provided a switchable window comprising: a first glass substrate and a second glass substrate; a liquid crystal inclusive layer disposed between at least the first glass substrate and the second glass substrate; a low-E coating provided between at least the liquid crystal inclusive layer and the first glass substrate; wherein the low-E coating includes at least one infrared (IR) reflecting layer comprising silver that is located between at least first and second dielectric layers; a substantially transparent conductive coating provided between at least the liquid crystal inclusive layer and the second glass substrate, so that voltage is to be applied to the liquid crystal inclusive layer via the low-E coating and the substantially transparent conductive coating which are on opposite sides of the liquid crystal inclusive layer; and wherein, by adjusting voltage applied to at least part of the liquid crystal inclusive layer via the low-E coating and the substantially transparent conductive coating, the window is selectively switchable between at least first and second states, where the window has a higher visible light transmission in the first state than in the second state. In certain preferred embodiments, the visible transmission of the window is at least 10% higher in the first state than in the second state, more preferably at least 20% higher in the first state than in the second state, more preferably at least 30% higher in the first state than in the second state, more preferably at least 40% higher in the first state than in the second state.

In the switchable window of the immediately preceding paragraph, it is preferred that no conductive layer is provided between the low-E coating and the liquid crystal inclusive layer.

In the switchable window of any of the preceding two paragraphs, a sheet resistance of the low-E coating may be less than about 15 ohms/square, more preferably less than about 6 ohms/square.

In the switchable window of any of the preceding three paragraphs, in the second state in certain example embodiments no or substantially no voltage is applied to said at least part of the liquid crystal inclusive layer via the low-E coating and the substantially transparent conductive coating, and in the first state in certain example embodiments sufficient voltage is applied to said at least part of the liquid crystal inclusive layer in order to cause liquid crystal molecules in at least a portion of the liquid crystal inclusive layer to substantially align in order to increase visible light transmission of the window.

In the switchable window of any of the preceding four paragraphs, voltage applied to the liquid crystal inclusive layer in the first state may be substantially higher than any voltage (including no voltage) applied to the liquid crystal inclusive layer in the first state.

In the switchable window of any of the preceding five paragraphs, (i) the substantially transparent conductive coating may be a transparent conductive oxide layer, such as of or including a material selected from the group consisting of indium-tin-oxide, zinc oxide, zinc aluminum oxide, tin oxide, and fluorine-doped tin oxide; or (ii) the substantially transparent conductive coating may comprise or consist essentially of another low-E coating including at least one infrared (IR) reflecting layer comprising silver located between at least first and second dielectric layers.

In the switchable window of any of the preceding six paragraphs, the low-E coating may comprise at least two IR reflecting layers comprising silver, wherein each of the IR reflecting layers comprising silver is located on and directly contacting a respective layer comprising zinc oxide in the low-E coating.

In the switchable window of any of the preceding seven paragraphs, other than the low-E coating, no conductive layer is located between the liquid crystal inclusive layer and the first glass substrate.

In the switchable window of any of the preceding eight paragraphs, a polymer based laminate layer may be located between at least the first glass substrate and the low-E coating. The polymer based laminate layer may be of or include PVB, TPU and/or EVA. In certain example embodiments, the polymer based laminate layer may be colored.

In the switchable window of any of the preceding nine paragraphs, the window may be a vehicle window, and the low-E coating may be adapted to be located on a vehicle exterior side of the liquid crystal inclusive layer and the second substrate may be adapted to be located on a vehicle interior side of the liquid crystal inclusive layer.

In the switchable window of any of the preceding ten paragraphs, the window may be a sunroof for a vehicle.

In the switchable window of any of the preceding eleven paragraphs, the low-E coating may be patterned into at least first and second different electrically addressable areas that are substantially electrically isolated from each other so that the first and second electrically addressable areas of the low-E coating can be separately electrically addressed. The first electrically addressable area of the low-E coating may be substantially surrounded by the second electrically addressable area of the low-E coating when viewed from above. Each of the first and second electrically addressable areas of the low-E coating may be for applying voltage to the liquid crystal inclusive layer in order to adjust visible transmission of the window; or alternatively the first electrically addressable area, but not the second electrically addressable area, of the low-E coating may be for applying voltage to the liquid crystal inclusive layer in order to adjust visible transmission of the window.

In the switchable window of any of the preceding twelve paragraphs, the low-E coating may be patterned into at least first, second, and third different electrically addressable areas that are substantially electrically isolated from each other so that the first, second, and third electrically addressable areas of the low-E coating can be separately electrically addressed. There may be at least a first bus bar in electrical communication with the first addressable area of the low-E coating, at least a second bus bar in electrical communication with the second addressable area of the low-E coating, and at least a third bus bar in electrical communication with the third addressable area of the low-E coating. At least two of the first, second and third electrically addressable areas of the low-E coating may be for applying voltage to the liquid crystal inclusive layer in order to adjust visible transmission of the window; or alternatively the first electrically addressable area of the low-E coating may be for applying voltage to the liquid crystal inclusive layer in order to adjust visible transmission of the window but the second and third electrically addressable areas of the low-E coating need not be for applying voltage to the liquid crystal inclusive layer in order to adjust visible transmission of the window. At least one LED or photovoltaic device may be provided electrically between the second and third electrically addressable areas of the low-E coating.

In the switchable window of any of the preceding thirteen paragraphs, the substantially transparent conductive coating (e.g., TCO or low-E coating) may be patterned into at least first, second, and third different electrically addressable areas that are substantially electrically isolated from each other so that the first, second, and third electrically addressable areas of the substantially transparent conductive coating can be separately electrically addressed. The first electrically addressable area may be for applying voltage to the liquid crystal inclusive layer in order to adjust visible transmission of the window, where the second and third electrically addressable areas optionally may not be for applying voltage to the liquid crystal inclusive layer in order to adjust visible transmission of the window. At least one LED or PV device may be provided electrically between the second and third electrically addressable areas.

In the switchable window of any of the preceding fourteen paragraphs, the liquid crystal inclusive layer may comprise a polymer dispersed liquid crystal (PDLC) layer.

In the switchable window of any of the preceding fifteen paragraphs, the window may be a vehicle window such as a sunroof, rear window, or side window.

In example embodiments of this invention, there is provided a switchable window comprising: a first substrate and a second substrate; a liquid crystal inclusive layer disposed between at least the first substrate and the second substrate; first and second transparent conductive coatings provided on opposite sides of the liquid crystal inclusive layer so that voltage can be applied to the liquid crystal inclusive layer via the first and second transparent conductive coatings, wherein by adjusting voltage applied to at least part of the liquid crystal inclusive layer via the first and second transparent conductive coatings the window is selectively switchable between at least first and second states, where the window has a higher visible light transmission in the first state than in the second state; wherein at least one of the first and second transparent conductive coatings is patterned into at least first, second, and third different electrically addressable areas that are substantially electrically isolated from each other so that the first, second, and third electrically addressable areas of the coating can be separately electrically addressed; wherein the first electrically addressable area of the coating is for applying voltage to the liquid crystal inclusive layer in order to adjust visible transmission of the window; and an electrically active device, wherein the second electrically addressable area of the coating, the electrically active device, and the third electrically addressable area of the coating are electrically connected in series.

In the switchable window of the immediately preceding paragraph, at least one of the first and second transparent conductive coatings may be a low-E coating.

In the switchable window of any of the preceding two paragraphs, the transparent conductive coating that is patterned into the first, second and third electrically addressable areas may be a low-E coating or a TCO.

In the switchable window of any of the preceding three paragraphs, the electrically active device may be an LED or photovoltaic (PV) device.

In the switchable window of any of the preceding four paragraphs, the second and third electrically addressable areas of the coating need not be for applying voltage to the liquid crystal inclusive layer in order to adjust visible transmission of the window.

The forgoing example embodiments are intended to provide an understanding of the disclosure to one of ordinary skill in the art. The forgoing description is not intended to limit the inventive concept described in this application, the scope of which is defined in the following claims.

What is claimed is:

1. A switchable window comprising:
a first glass substrate and a second glass substrate for the window;
a liquid crystal inclusive layer disposed between at least the first glass substrate and the second glass substrate;
a solar control coating provided between at least the liquid crystal inclusive layer and the first glass substrate;
wherein the solar control coating comprising, in the following order, a first dielectric layer, a layer comprising zinc oxide, an infrared (IR) reflecting layer comprising silver, a metal inclusive layer, and another dielectric layer, so that the IR reflecting layer is located between at least the first and second dielectric layers;
a conductive coating provided between at least the liquid crystal inclusive layer and the second substrate, so that voltage is to be applied to the liquid crystal inclusive layer via the solar control coating and the conductive coating which are on opposite sides of the liquid crystal inclusive layer; and
wherein the window is configured so that, by adjusting voltage applied to at least part of the liquid crystal inclusive layer via the solar control coating and the conductive coating, the window is selectively switchable between at least first and second states, where the window has a higher visible light transmission in the first state than in the second state.

2. The switchable window of claim 1, wherein no conductive layer is provided between the solar control coating and the liquid crystal inclusive layer.

3. The switchable window of claim 1, wherein a sheet resistance of the solar control coating is less than about 15 ohms/square.

4. The switchable window of claim 1, wherein a sheet resistance of the solar control coating is less than about 6 ohms/square.

5. The switchable window of claim 1, wherein, in the second state no or substantially no voltage is applied to said at least part of the liquid crystal inclusive layer via the solar control coating and the conductive coating, and in the first state sufficient voltage is applied to said at least part of the liquid crystal inclusive layer in order to cause liquid crystal molecules in at least a portion of the liquid crystal inclusive layer to substantially align in order to increase visible light transmission of the window.

6. The switchable window of claim 5, wherein the voltage applied to the liquid crystal inclusive layer in the first state is substantially higher than any voltage applied to the liquid crystal inclusive layer in the first state.

7. The switchable window of claim 1, wherein the conductive coating comprises a transparent conductive oxide layer.

8. The switchable window of claim 7, wherein the transparent conductive oxide layer comprises a material selected from the group consisting of indium-tin-oxide, zinc oxide, zinc aluminum oxide, tin oxide, and fluorine-doped tin oxide.

9. The switchable window of claim 1, wherein a polymer based laminate is located between at least the first substrate and the solar control coating.

10. The switchable window of claim 1, wherein the window is a vehicle window, and wherein the solar control coating is adapted to be located on a vehicle exterior side of the liquid crystal inclusive layer and the second substrate is adapted to be located on a vehicle interior side of the liquid crystal inclusive layer.

11. The switchable window of claim 1, wherein the window is a sunroof for a vehicle.

12. The switchable window of claim 1, wherein the solar control coating is patterned into at least first and second different electrically addressable areas that are substantially electrically isolated from each other so that the first and second electrically addressable areas of the solar control coating can be separately electrically addressed.

13. The switchable window of claim 12, wherein the first electrically addressable area of the solar control coating is substantially surrounded by the second electrically addressable area of the solar control coating when viewed from above.

14. The switchable window of claim 1, wherein the metal inclusive layer comprising NiCrOx.

15. The switchable window of claim 1, wherein the first dielectric layer comprises an oxide of titanium.

16. The switchable window of claim 1, wherein the second dielectric layer comprises tin oxide.

* * * * *